April 1, 1947.  J. GROSS ET AL  2,418,225
DEVICE FOR ILLUMINATING AND EXHIBITING TRANSPARENCIES
Filed Nov. 8, 1944
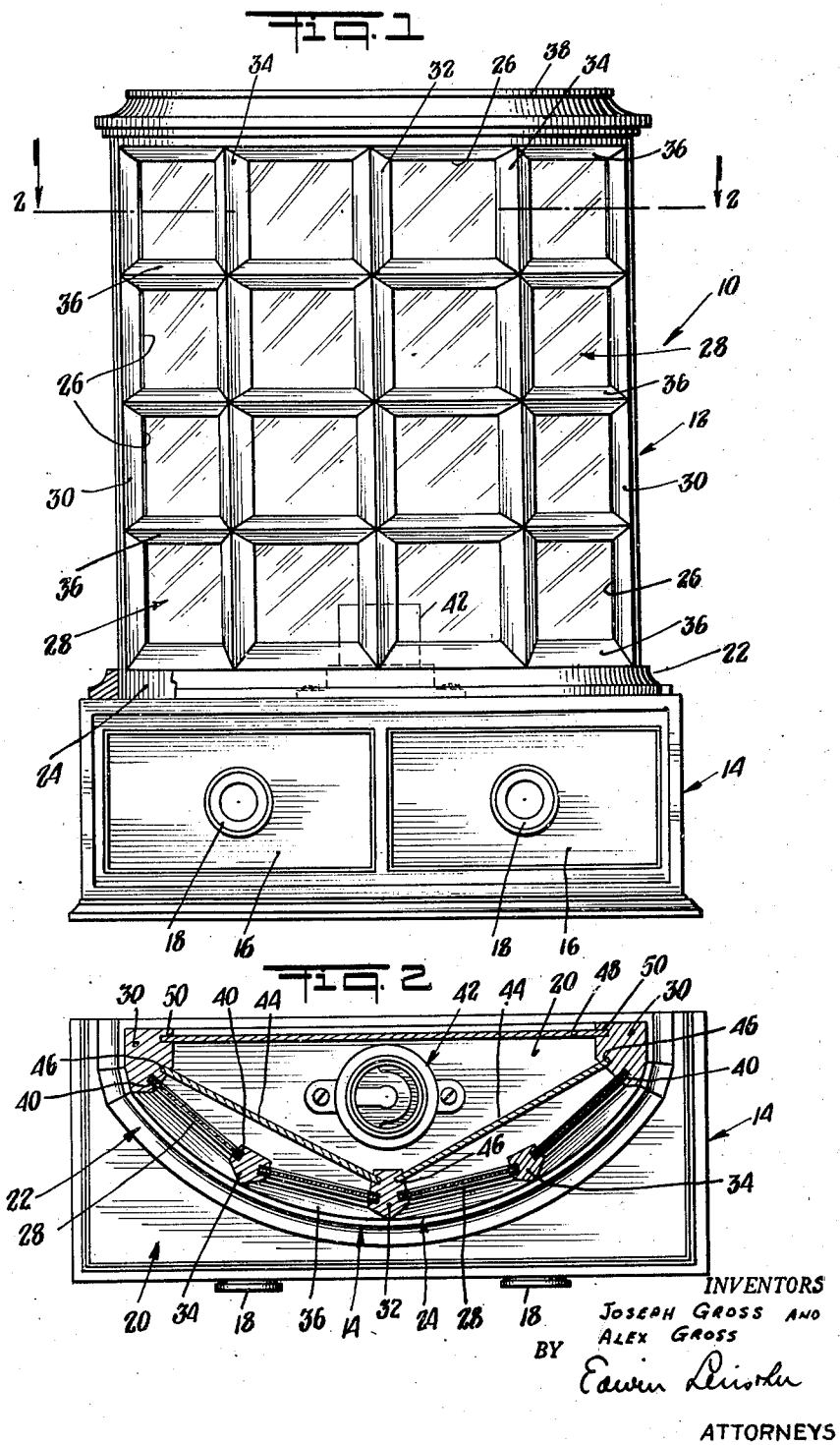
INVENTORS
JOSEPH GROSS AND
ALEX GROSS
BY
Edwin Leinster
ATTORNEYS

UNITED STATES PATENT OFFICE 2,418,225

DEVICE FOR ILLUMINATING AND EXHIBITING TRANSPARENCIES

Joseph Gross and Alex Gross, Brooklyn, N. Y.

Application November 8, 1944, Serial No. 562,488

3 Claims. (Cl. 40—132)

This invention relates to a device for exhibiting transparencies, for example, photographic transparencies such as "Kodachrome" or other colored or black and white transparencies.

The primary object of the present invention is the provision of a device in which a plurality of transparencies can be mounted for the viewing thereof.

Another object of the invention is the provision of a device for the above purpose and which is in the form of a cabinet suitable for home or business display.

A further object of the invention is the provision of a cabinet, constructed and arranged to facilitate the loading and unloading thereof with a plurality of transparencies.

Another object of the invention is to provide a device with means for obtaining proper illumination of the transparencies.

A yet further object of the invention is generally to provide a device which is of simple construction and which is well adapted to provide for the illuminated display of a plurality of transparencies.

The above and other objects, features and advantages of the invention will be fully understood from the following description, reference being had to the accompanying illustrative drawings.

In the drawings:

Fig. 1 is a front view of a device embodying the present invention;

Fig. 2 is a transverse sectional view on the line 2—2 of Fig. 1.

Referring now to the drawings in detail, the display or viewing device 10 of the present invention is preferably, as here shown, in the form of a cabinet and in such form comprises a display part 12 and a base 14 on which display part 12 is mounted, preferably in removable relation thereto. Base 14 is preferably in the form of a chest provided with one or more slidable drawers 16 for storing a plurality of transparencies. As here shown, the drawers 16 are provided with handles or knobs 18. Base 14 is provided with a flat top wall 20 having a raised portion or rib 22 which as here shown is peripherally continuous and conforms to the contour of the lower peripheral edge portion 24 of display part 12, said rib defining a recess into which the lower end of display part 12 has a removable fit.

The display part is provided with a plurality of openings 26 through which the transparencies 28 are visible at the front of the device. Said transparencies can be of any well known type, for example, "Kodachrome" or other colored or black and white transparencies. As here shown main part 12 is in the form of an outwardly convex member or front wall in which said plurality of openings 26 are provided. It will be understood, however, that the front wall of display part 12 can be planar or of any other suitable contour. In the illustrated form of display part 12, the latter comprises laterally spaced longitudinally extending end parts 30, a central part 32 and intermediate parts 34. All of said longitudinal parts 30, 32 and 34 extend for substantially the full length of display part 12 and are traversed by spaced parts 36 which together with said longitudinal parts define said openings 26. The opening-defining portions of the longitudinal and lateral parts are bevelled, as illustrated for decorative purposes and constitute, in effect, individual frames for the transparencies mounted in the companion openings. Display part 12 is open at one end thereof, which in the illustrated form of the invention is the lower end of said part, the opposite or upper end of said part being closed by a flat part 38. The display member of part 12 which consists of the lower edge portion 24, the longitudinal parts 30, 32 and 34, the lateral parts 36 and the upper part 38 is preferably molded in one piece of a suitable plastic, but it is within the scope of the present invention to form said display part of wood, metal, or of any other suitable material and to form the same either in one piece or in a plurality of initially separate pieces secured to each other in any suitable way.

The longitudinal parts 30, 32 and 34 are each provided with grooves 40 in their confronting edges, said grooves extending for substantially the full length of said longitudinal parts in continuous fashion and being open at the open end of display part 12. As clearly shown in Fig. 2, the transparencies are mounted in these grooves, the latter being dimensioned to have the transparencies fit therein in slidable relation longitudinally of said longitudinal parts. More specifically, since the display device of the present invention is intended primarily for standard 35 mm. "Kodachrome" or other colored or black and white transparencies or slides, the vertical and lateral opening-defining parts are spaced accordingly and the grooves in the vertical parts are dimensioned to be slidably engaged by the marginal edge portions of the slides or transparencies, the latter being framed by the opening-defining portions, as illustrated in Fig. 1. It will be understood that the arrangement is such that the transparencies are inserted in the display wall of display part 12 through the lower open end thereof, said display part 12 being removed from base 14, the arrangement being further such that when as here shown main display part 12 is in vertical position, the lowermost slides or transparencies are supported on wall 20 and the successive slides or transparencies above said lowermost slides or transparencies are supported on the upper edges, respectively, of the slides or transparencies therebelow.

The display device of the present invention is provided with means for properly illuminating the slides or transparencies. For this purpose an electric lamp 42 is mounted on the top 20 of base 14 in position to project within the chamber of display part 12 when the latter is mounted on said base. Preferably, a tubular lamp (not shown) is mounted in socket 42 for illuminating the slides or transparencies, the longitudinal axis of said tubular lamp extending longitudinally of part 12. Light diffusion screens 44 are positioned within part 12 back of openings 26 in position to diffuse the light transmitted to the inner surfaces of the transparencies which are positioned in framed openings 26. Said light diffusion screens can be formed of translucent glass or can be any other type of light diffusion screens. End longitudinal members 30 and central longitudinal member 32 are provided with grooves 46 in their confronting edges to receive and position the light diffusion screens 44. It will be understood that said light diffusion screens extend for the full length of display part 12, that is from the uppermost lateral part 36 to the lowermost lateral part 36. The lower ends of grooves 46 can be provided with any suitable means for supporting the lower ends of light diffusion screens 44 in said grooves whereby to retain the light diffusion screens in display part 12 when the latter is removed from base 14 or any other support on which display part 12 may be mounted. In this connection, it will be understood that main display part 12 can be mounted on a table or other suitable support instead of being mounted on base 14 and that a lamp can be positioned on such table or other support within the chamber defined by part 12. Thus, said main part 12 can be considered as a cabinet whether or not it is provided with a companion base. Part 12 is closed at its back by a plate 48 slidable in grooves 50 provided in the confronting edges of end parts 30 and said closure plate 48 can be provided with openings for the escape of heat of the illumination means in the chamber or interior of display part 12. It will be understood that when the interior of the cabinet is illuminated or when light is allowed to strike the inner surfaces of the transparencies, the latter may be viewed individually and collectively at the front of the cabinet, this being a desirable feature especially when the transparencies are in a related series either pictorially or with respect to some occasion or in some other manner. Since each opening 26 is closed by one of the transparencies mounted therein, the edges of the transparencies being concealed by the frames of the openings 26, the device has a pleasing ornamental appearance which is enhanced as a result of the collective display, and can be used as an ornamental or decorative article in the home as well as a transparency viewing device. It will be noted that the cabinet 10 can be made in various ornamental or decorative forms and is ordinarily small enough to be mounted on a table, bureau, shelf or the like in the home, but of course said cabinet can be made in larger sizes and can be used not only in the home but also in stores or other business places for display purposes.

Thus it is seen that the above described device is well adapted to accomplish the objects of the present invention. It will be understood, however, that our invention may be embodied otherwise than as herein shown or described and that in the illustrated embodiment certain changes in the details of construction and in the arrangement of parts may be made without departing from the underlying idea of our invention within the scope of the appended claims.

Having thus described our invention, what we claim and desire to secure by Letters Patent is:

1. A device for displaying a plurality of transparencies, comprising a molded one-piece member shaped to define a chamber and having a plurality of individual front openings, said member having a plurality of opposed grooves formed therein to receive marginal edge portions of the transparencies for the mounting thereof in positions back of and adjacent to said openings, respectively, said member also having opposed grooves back of said first mentioned grooves to receive marginal edge portions of a light-diffusion screen for mounting the same back of the transparencies, said chamber providing a space back of the screen to receive means for illuminating the transparencies.

2. A device for displaying a plurality of transparencies, comprising a molded one-piece member shaped to define a chamber and having a plurality of individual front openings, said member having a plurality of opposed grooves formed therein to receive marginal edge portions of the transparencies for the mounting thereof in positions back of and adjacent to said openings, respectively, said member also having opposed grooves back of said first mentioned grooves to receive marginal edge portions of a light-diffusion screen for mounting the same back of the transparencies, said chamber providing a space back of the screen to receive means for illuminating the transparencies, said member being open at one end thereof and said grooves being open at said end for the insertion of said transparencies and said screen.

3. A device for displaying a plurality of transparencies, comprising a molded one-piece member shaped to define a chamber and having a plurality of individual front openings, said member having a plurality of opposed grooves formed therein to receive marginal edge portions of the transparencies for the mounting thereof in positions back of and adjacent to said openings, respectively, said member also having opposed grooves back of said first mentioned grooves to receive marginal edge portions of a light-diffusion screen for mounting the same back of the transparencies, said chamber providing a space back of the screen to receive means for illuminating the transparencies, said member being open at one end thereof and said grooves being open at said end for the insertion of said transparencies and said screen, and a base on which said member is removably mounted and which closes said open end thereof.

JOSEPH GROSS.
ALEX GROSS.

REFERENCES CITED

The following references are of record in the file of this patent:

UNITED STATES PATENTS

| Number | Name | Date |
| --- | --- | --- |
| 1,700,383 | Smigielsky | Jan. 29, 1929 |
| 1,747,400 | Stewart et al. | Feb. 18, 1930 |
| 1,775,151 | Auerbach | Sept. 9, 1930 |
| 1,913,585 | Crosby | June 13, 1933 |